July 11, 1961 H. C. PAULSEN 2,992,194
METHODS AND DEVICES FOR MIXING AND DISCHARGING FLUID COMPONENTS
Filed Sept. 9, 1958 2 Sheets-Sheet 1
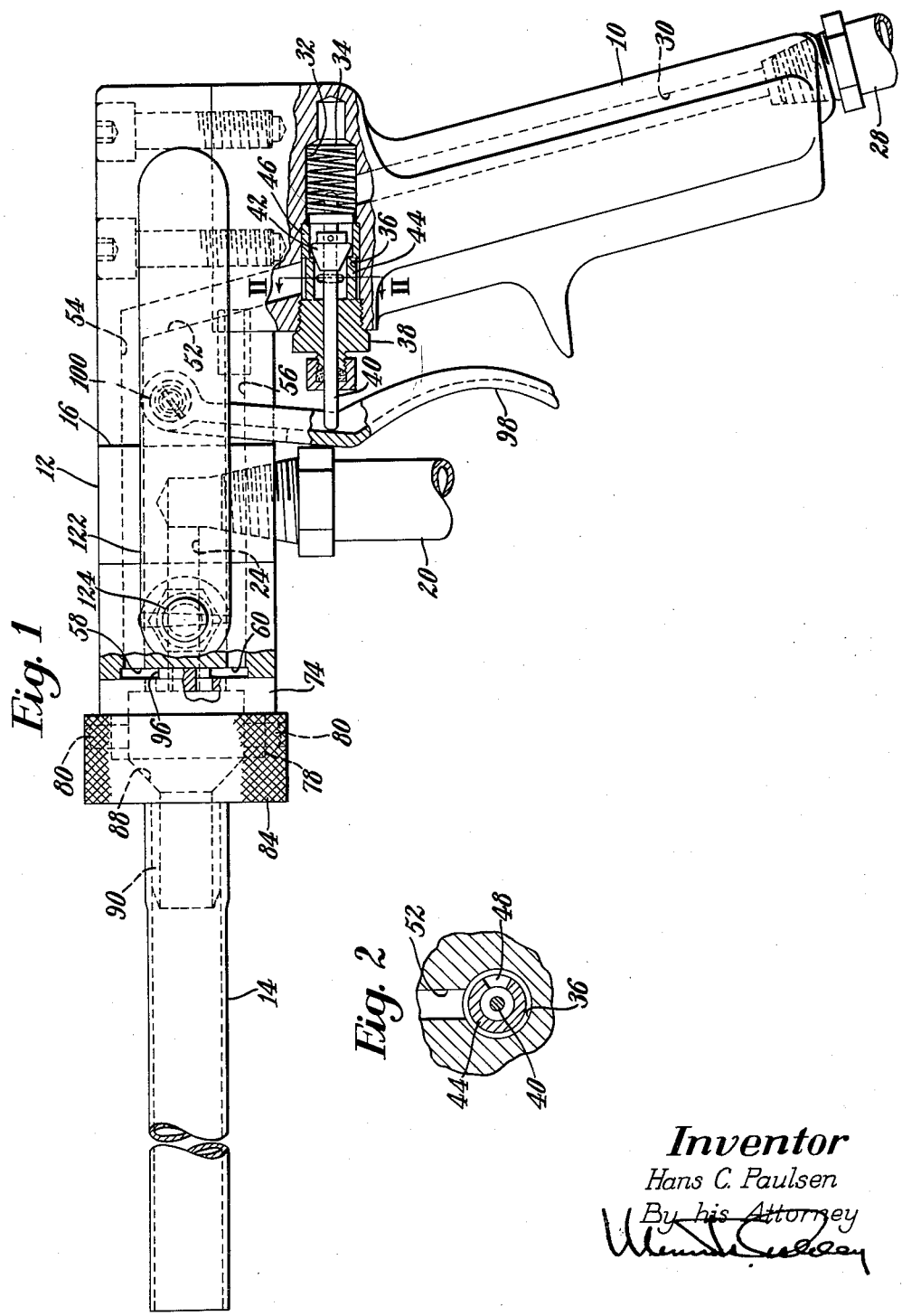
*Inventor*
*Hans C. Paulsen*
By his Attorney July 11, 1961 H. C. PAULSEN 2,992,194
METHODS AND DEVICES FOR MIXING AND DISCHARGING FLUID COMPONENTS
Filed Sept. 9, 1958 2 Sheets-Sheet 2
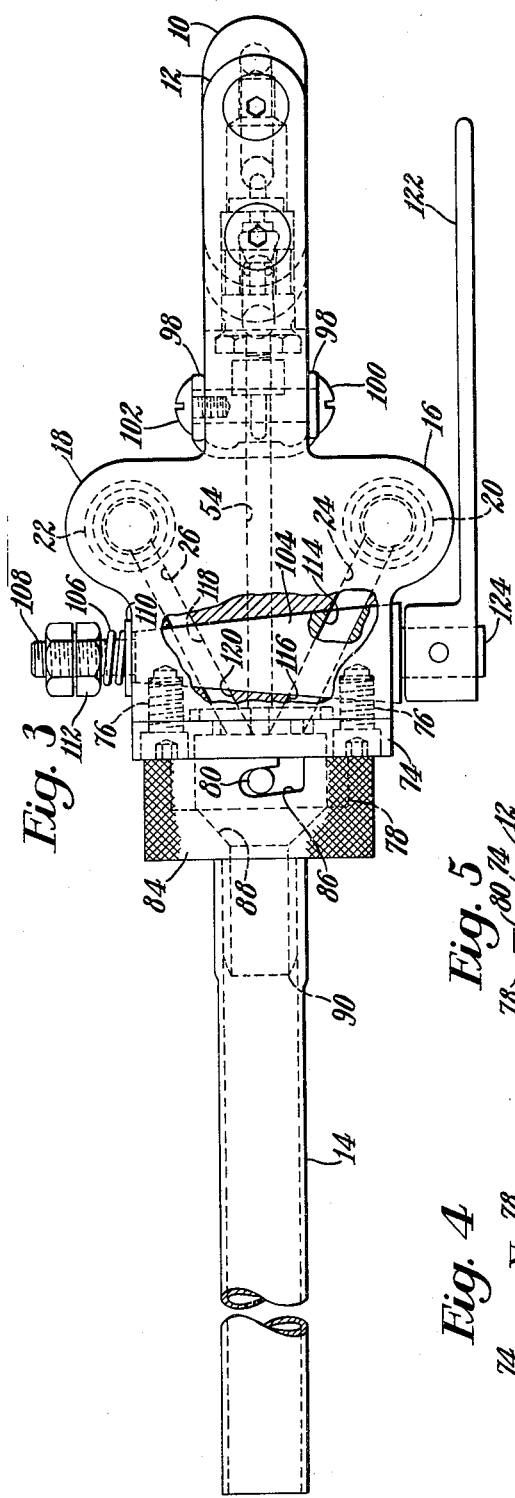
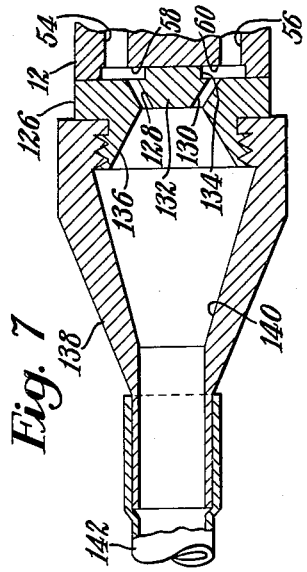
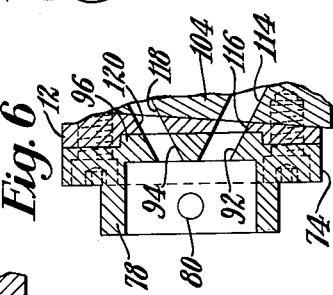
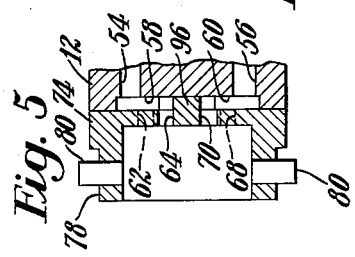
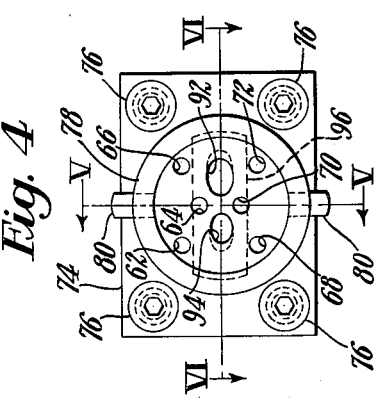

United States Patent Office 2,992,194
Patented July 11, 1961

---

2,992,194
METHODS AND DEVICES FOR MIXING AND DISCHARGING FLUID COMPONENTS

Hans C. Paulsen, Lexington, Mass., assignor to B. B. Chemical Co., Boston, Mass., a corporation of Massachusetts
Filed Sept. 9, 1958, Ser. No. 760,028
9 Claims. (Cl. 260—2.5)

This invention relates to methods and devices for mixing and discharging fluid components and is herein illustrated as embodied in a device for mixing and discharging the liquid components of foaming plastics.

The mixing of the components of foaming plastics by devices and methods heretofore employed has been subject to the influence of atmospheric conditions, particularly variations in temperature and humidity. In the practice of known methods of mixing the components of foaming plastics the components are exposed to the atmosphere during the mixing operation and consequently the components are modified to some degree by the discharge of their volatile elements into the atmosphere. The formulation of the components takes this loss into account but it will be understood that variations in atmospheric conditions seriously affect the extent of the loss of volatile elements in the components. It has not been found practicable to alter the formulation in accordance with variations in atmospheric conditions with sufficient accuracy to insure a high grade product under all conditions. Consequently it is desirable to eliminate, as far as practicable, the influence of atmospheric conditions on the components during the mixing operation. To this end it is proposed to provide a device in which the mixing process from the initial mixing of the components to the prefoaming stage occurs within wholly or at least partially closed chambers.

With the above object in view, the present invention contemplates the provision of means for mixing and discharging fluid components comprising a structure providing a primary mixing chamber into which are conducted the components to be mixed together with air under pressure. The structure also provides a secondary mixing chamber in the form of an elongate tube characterized by a non-wettable interior surface, said tube being disposed to receive partially intermixed components from the primary mixing chamber. The length and internal diameter of said tube has a predetermined relation to the pressure of the air vehicle and to the aggregate volumetric rate of flow of the components to the primary mixing chamber. The length and diameter of the secondary mixing chamber are such that the mixing operation is fully completed when the fluid is discharged therefrom. By adjusting the volumetric capacity of the secondary mixing chamber to the air pressure and the volumetric rate of flow of the components it has been found practicable to provide a mixture which will reliably produce a product of uniformly high grade.

In order to effect the initial mixing of the components in the primary mixing chamber, the illustrated device is provided with means for conducting the components into the mixing chamber in paths such that interfluence of the components occurs at a point within the chamber and, to further promote the mixing action, the air streams are conducted into the primary mixing chamber in paths directed toward the interfluence of the streams of components.

In its relation to methods of mixing and discharging liquid components the present invention comprises the steps of separately conducting a plurality of liquid components to a primary mixing chamber, effecting the interfluence of streams of liquid components in the primary mixing chamber, subjecting the components in the mixing chamber to the action of a plurality of air streams under pressure sufficient to effect partial intermixing of the components by turbulence but insufficient to atomize the components, employing the air delivered to the primary mixing chamber as a vehicle to conduct the partially intermixed components from the primary mixing chamber through an elongate secondary mixing chamber, and to effect the completion of the intermixing of the components within the secondary mixing chamber by their interflow along the inner surface of the chamber and by the disintegration of waves of fluid in the chamber by the force of the air stream.

The invention will now be described with reference to the accompanying drawings and pointed out in the appended claims.

In the drawings,

FIG. 1 is a side elevation, partly in section, illustrating a device embodying the features of the present invention;

FIG. 2 is a section taken on the line II—II of FIG. 1;

FIG. 3 is a plan view, partly in section, illustrating the device shown in FIG. 1;

FIG. 4 is a detail view illustrating a member providing the rear wall and the peripheral surface of the primary mixing chamber;

FIG. 5 is a section taken on the line V—V of FIG. 4;

FIG. 6 is a section taken on the line VI—VI of FIG. 4; and

FIG. 7 is a section taken on the same plane as FIG. 5 illustrating an alternative construction.

Referring to FIG. 1, the invention is illustrated as embodied in a pistol-shaped structure comprising a hand grip 10, a barrel 12 and a tubular member 14 projecting from the forward end of the barrel and removably connected thereto. Approximately midway between its ends the barrel 12 has lateral extensions or bosses 16 and 18 (FIG. 3). Referring to FIG. 1, the boss 16 has attached thereto a flexible tube 20. Similarly the boss 18 at the right side of the barrel 12 has attached thereto a flexible tube 22. As shown in FIG. 3, the tubes 20 and 22 communicate respectively with ducts 24 and 26 which converge forward relatively to each other and communicate at their forward ends with other ducts, hereinafter described, which communicate with a primary mixing chamber. Referring to FIG. 1, the hand grip 10 has attached thereto a flexible tube 28 whereby compressed air is conducted to the device. Compressed air delivered by the tube 28 is conducted through a duct 30 in the hand grip 10 to a chamber 32 formed in the upper portion of the hand grip, said chamber being cylindrical in shape and disposed in parallel relation to the axis of the barrel 12. Mounted in the chamber 32 and seated against its rear end wall is a compression spring 34 which serves to close a valve now to be described. Mounted in the threaded forward portion of a counterbore 36 communicating with the chamber 32 is a screw plug 38 which is axially drilled to receive a stem 40 which carries a frusto-conical valve element 42 arranged to be seated against the rear edge face of a collar 44 confined between the plug 38 and a collar 46 somewhat larger in diameter than the collar 44. It will be seen that the screw plug 38 is tightened against the collar 44 seating it against the collar 46 which in turn is seated against the base of the counterbore 36. Referring to FIG. 2, the collar 44 has formed therein a peripheral slot 48 for the passage of air into an annular chamber surrounding the collar 44 and communicating with a duct 52 which, as shown in FIG. 1, extends upwardly with a forward inclination to the upper portion of the barrel 12. The duct 52 has two branches, an upper branch 54 and a lower branch 56 extending forwardly parallel to and equidistant from the axis of the barrel 12. The upper branch 54 communicates at its forward end with a manifold chamber 58 and the lower branch 56 communicates at its forward end with a similar manifold chamber 60. Air passes out of the manifold chamber 58 and into the primary mixing chamber through three ports 62, 64 and 66 (FIG. 4) and similarly air flows from the manifold chamber 60 into the primary mixing chamber through three ports 68, 70 and 72. The six ports above referred to are formed in a rectangular member 74 (FIG. 4) secured by headed screws 76 to the forward end face of the barrel 12. Formed integrally with and projecting forwardly from the member 74 is a cylindrical extension 78 which surrounds the six ports above referred to and provides a peripheral surface of the primary mixing chamber. The rear surface of said chamber is provided by a recessed portion of the member 74 within the cylindrical extension 78. Mounted in and projecting outwardly from the cylindrical extension 78 in opposite directions common to a diameter of said extension are two cylindrical pins 80 which provide means for attaching to the extension 78 a knurled cylindrical member 84 having bayonet slots 86 which receive the pins 80. It will be seen that a slight turning movement of the member 84 causes it to be securely clamped between the pins 80 and the member 74. Formed in the member 84 is a frusto-conical recess 88 which, in the illustrated organization, is the forward portion of the primary mixing chamber. For attaching to the member 84 the tubular member 14 a cylindrical nipple 90 is formed integrally with a member 84 and extends forwardly therefrom in coaxial relation to the axis of the primary mixing chamber. As shown in FIG. 1, the tubular member is frictionally attached to the outer surface of the nipple. The components to be intermixed flow from the ducts 24 and 26 through ports 92 and 94, respectively (FIG. 6), formed in the member 74. To provide for direct communication between the ducts and the ports the member 74 has projecting from its rear surface a land 96 which is seated against the base of a recess in the barrel 12 forming the rear walls of the two manifold chambers 58 and 60.

For opening the valve 42 to permit the passage of air from the duct 30 to the duct 52 the illustrated device is provided with a trigger 98 for imparting rearward movement to the valve stem 40. The upper portion of the trigger is bifurcated to embrace the relatively narrow rear portion of the barrel 12. Referring to FIG. 3, the trigger is pivotally mounted on a headed pin 100 extending through the barrel and through the upper end portions of the trigger. A headed retaining screw 102 mounted in the pin 100 holds the pin against endwise movement relatively to the barrel 12. As shown in FIG. 1, the lower portion of the trigger is channel-shaped and the forward end portion of the valve stem is positioned between the walls of the channel and in abutting relation to its base. For closing the ducts 24 and 26 a frusto-conical plug valve 104 (FIG. 3) is mounted for angular movement in a frusto-conical bore extending widthwise of the barrel through its forward portion. The valve body is retained within the bore by the pressure of a spring 106 surrounding a threaded stem 108 projecting from the small end of the valve body, the spring being confined between a washer 110 mounted on the stem and arranged to bear against the right side wall of the barrel 12 and a nut 112 mounted on the stem. In the open position of the valve, as shown in FIGS. 3 and 6, a duct 114 extending angularly through the valve body connects the duct 24 to a duct 116 which communicates with the port 92 which opens into the primary mixing chamber. Similarly a duct 118 extending angularly through the valve 104 in converging relation to the duct 114 connects the duct 26 to a duct 120 which communicates with the port 94 which opens into the primary mixing chamber. To facilitate operation of the valve 104 a handle 122 is secured to a stem 124 projecting axially from the large end of the valve body.

In the alternative construction illustrated in FIG. 7 a ported member, corresponding generally to the member 74 illustrated in FIG. 5, is identified by the numeral 126. This member has a reduced central section having formed therein two air ports 128 and 130 which converge forwardly, each at an angle of 30° to the axis of the barrel. In the construction illustrated in FIG. 7 the ports for the liquid components are identical in construction and arrangement to the ports 92 and 94 illustrated in FIG. 6. Extending rearwardly from the reduced central portion 132 of the member 126 is a land 134 corresponding in construction and disposition to the land 96 illustrated in FIG. 4. As in the construction shown in FIG. 4 the ports through which flow the liquid components extend through said land 134 and through the central portion 132 of the member 126 into the primary mixing chamber. An interior wall 136, frusto-conical in shape, extends from the central portion 132 forwardly to the forward wall of the member 126. The forward portion of the member 126 is reduced to a cylindrical shape and threaded to receive a member 138 corresponding generally to the member 84 illustrated in FIG. 3. The member 138 is substantially longer than the member 84. Thus, the greater part of the primary mixing chamber in FIG. 7 is enclosed by the frusto-conical inner surface 140 of the member 138 which, in this case, defines a substantially lesser angle to the axis of the barrel than the inner surface 88 of the member 84. It has been found that the structure illustrated in FIG. 7 affords a greater degree of intermixing in the primary mixing chamber than the structure illustrated in FIG. 1 and thus permits the use of a substantially shorter mixing tube 142. Except as above described, the alternative construction is similar to the construction illustrated in FIG. 1.

The illustrated devices are particularly adapted for the mixing of components to form polyurethane foams. Polyurethane foams are formed from reaction products of a di- or polyisocyanate and materials having more than one active hydrogen atom. The preferred reactive compositions are mixtures of a prepolymer prepared by reaction of a di- or polyisocyanate and material having two or more active hydrogen atoms such as a polyester, polyester amide, a glycol or an ether glycol, a gas forming material, usually water, and catalyst. Useful isocyanate materials include toluene diisocyanate, metaphenylene diisocyanate, metatolylene diisocyanate, 3,3', bitolylene 4,4' diisocyanate, paraphenylene diisocyanate, and 1 chloro 2,4 phenylene diisocyanate. For reaction with the isocyanate material, many materials having two or more active hydrogen atoms may be used. For example, as disclosed in the prior art, polyesters, polyesteramides, polyalkylene glycols, polyoxyalkylene glycols, and natural products such as castor oil and its derivatives having reactive, preferably terminal, hydroxyl groups or carboxyl groups may be reacted with the di- or polyisocyanate. The di- or polyisocyanate is employed in an amount more than sufficient to provide —NCO groups for reaction with all the active hydrogen atoms and the partial reaction products or prepolymers will contain —NCO groups and preferably free polyisocyanate for subsequent gas forming and cross linking reaction. In general the mixture should be compounded to provide at least about 1.2 —NCO groups to each active hydrogen group and the preferred range is from 2:1 to 10:1. The partial reaction products are mixed with water and catalyst such as organic, preferably tertiary, amines, or other alkaline materials. The mixtures are fluid compositions having desirable viscosity characteristics for processing and are foamable at room temperature or above.

It has been observed that the reaction of the components to form a resin foam takes place in stages. A short time after initial mixing, e.g., in a matter of seconds or less, there is an increase in viscosity without substantial evolution of gas. This is referred to as a prefoaming stage and is observable as a milkiness or opacity of the reaction mixture. The increase in viscosity apparently is important in enabling the resinous material to hold the foaming gases.

In the illustrated mixing device an initial rough mixture of the components is effected in the primary mixing chamber into which the components flow from the ducts 116 and 120 and into which air under pressure flows through the ports in the member 74 or, in the alternative construction illustrated in FIG. 7, the member 126. The mixing of the ingredients in the primary mixing chamber is effected in part by interfluence of the liquid components and in part by turbulence caused by the air streams. It is to be noted that the air streams are not so disposed nor of such high velocity as to atomize the components entering the primary mixing chamber. This is important in the operation of the illustrated device which is organized to complete the intermixing of the components within the two mixing chambers and this requires the maintenance of the components in a state in which they will flow along the surface of the mixing tube rather than being carried through the tube in suspension in the air stream. From the primary mixing chamber the roughly mixed components are advanced by the flow of air into the tube 14 in a sputtery fashion. The rough liquid mixture of the components is deposited on the inner surface of the tube in irregular rings or waves which move forward in irregular fashion. It is believed that the rings or waves of liquid are blown forward by the air stream and that at times the tops of the waves are blown off by the flow of air and redeposited farther down the tube. It is believed that the final mixing which causes effective and complete intermixing or combination of the components is accomplished by the folding over of the waves as they advance through the tube. It is preferred to employ a tube of non-metallic material. The reason for this is not entirely clear but one theory is that the heat conductivity of metal adversely affects the mixing and the subsequent reaction of the components. Since the reaction apparently takes place in stages it is possible that the conductivity of a metallic tube alters the temperature of components flowing through the tube so that their reaction does not proceed uniformly to the prefoaming stage in all portions of the mixture. Thermal factors which increase or decrease the temperature of the tube and the mixture therein are first, the cooling effected by the expansion of compressed air which may absorb sensible heat from the components, and, second, the exothermic heat of reaction generated by the intermixing of the components.

The theory above set forth is advanced as of possible assistance in the comprehension of the invention and it is to be understood that the patentability of the appended claims is not predicated upon the correctness of this theory.

It has been found convenient to use polyethylene tubes because of their low price and their inertness and further because of their non-adhesive surface characteristics relatively to the components both before and after the completion of their intermixing. However, other non-metallic tubes made of material such as glass, cardboard, or various commercially available plastics, including rubber, may be used provided the material is not subject to attack by the components or by the intermixture thereof. It is believed that the surface character of the interior of the tube is a further important factor. Tube materials such as polyethylene, polytetrafluoroethylene, and the like, which are not wet by the components have been found to give the most effective mixing action. It appears that the non-wetting surface aids the components to collect in the irregular rings or waves noted above to give the kind of mixing action described.

It has been found that although smooth surfaced metal tubes, such as a smooth stainless steel tube, do not give the desired mixing action, a black iron pipe will give a mixing action which is satisfactory for some purposes when operated with relatively high air flow. It is not clear whether this special case is due to turbulent flow caused by the irregular interior surface of the pipe or whether it is due to a surface film of non-metallic material, for example, re-acted polyurethane resin or mill scale on the interior surface of the pipe.

In the performance of the secondary intermixing of the components in the tube 14 the length and the internal diameter of the tube have a determinate relation to the pressure of air flowing through the mixing chambers and to the volumetric rate of flow of the components into the primary mixing chamber. Assuming an air pressure of 50 p.s.i. and a delivery rate of the components of 5 to 7 pounds per minute the tube 14 should be 20 inches long and one-half an inch in internal diameter. If the tube is cut shorter than 20 inches the material delivered from the tube would not be fully mixed and the non-uniform product produced thereby would have visible imperfections which would make it unsuitable for many uses. If, on the other hand, the tube is more than 20 inches long premature foaming or development of cell structure would occur within the tube and the product produced by the intermixture would be characterized by an irregular cell structure which would render the product unacceptable for many uses. By providing a length of tube accurately proportioned to the pressure of air flowing into the primary mixing chamber and to the volumetric rate of flow of the liquid components into the primary mixing chamber it has been found practicable to produce a product which is universally acceptable by reason of the complete absence of visible surface irregularities and, further, by reason of the uniformity of its cell structure.

If the initial mixing of the components is effected in an organization of the type illustrated in FIG. 7 the length of the tube, identified in FIG. 7 by the numeral 142, is substantially less than the length of the tube 14 by reason of the fact that a greater degree of intermixing occurs in the primary mixing chamber of the device illustrated in FIG. 7 than in the primary mixing chamber of the device illustrated in FIG. 1. Assuming the same air pressure and the same volumetric rate of flow as specified in the preceding paragraph the tube 142 would be 15 inches long.

An example of the provision and the intermixture of components in the illustrated apparatus will now be set forth.

80 parts by weight of an 80:20 mixture of the 2,4 and 2,6 isomers of tolylene diisocyanate were placed in a reaction vessel. To the tolylene diisocyanate there were added 20 parts of a liquid polyester resin having an OH number of 360, an acid number of 1, and a water content of 0.1%. The mixture was heated for one hour at 110° C. and formed a material referred to as a partial prepolymer having an —NCO to —OH ratio of 7.2:1.

91.8 parts by weight of the same polyester were mixed with 2 parts by weight of N-methyl morpholine (a catalyst), 5.4 parts by weight of water, and .8 part by weight of sorbitan monopalmitate (a surface active agent).

The partial prepolymer and the above mixture of polyester, N-methyl morpholine and water were pumped into a device, such as that partially illustrated in FIG. 7, equipped with a polyethylene tube 15 inches long and one-half inch in internal diameter in the ratio of 100 parts to 60 parts, respectively, and at the aggregate rate of flow of 5 lbs. per minute. Air was supplied to the device under 50 p.s.i.

The mixed material was deposited on the walls of the polyethylene tube in irregular rings or waves which moved forward in irregular fashion and was discharged from the end of the tube as a milky material in the prefoaming stage. Material from the tube was discharged into a mold, moving the end of the nozzle around to insure filling of all parts of the mold. In the course of moving the nozzle, freshly mixed material was deposited on earlier mixed material. When the required amount of mixed material was introduced into the mold, the valve 104 was closed to arrest the flow of components into the primary mixing chamber, and the mixture was allowed to expand to fill the mold. On completion of foaming and setting, the mold was charged with a uniform cellular resinous material exhibiting extremely uniform cell size throughout its thickness even in portions where freshly mixed material was deposited on earlier mixed material.

While the invention is herein illustrated and described in its embodiment in a device for intermixing the components of cellular plastic compositions, it is to be understood that the invention in its application to means for mixing and discharging fluid components is not limited to devices for mixing the components of cellular plastic compositions but is applicable as well to devices of this type designed for intermixing other fluid components.

Having thus described my invention, what I claim as new and desire to secure by Letters Patent of the United States is:

1. Means for mixing and discharging liquid components comprising a primary mixing chamber constructed to receive a plurality of liquid components and to receive air under pressure serving as a vehicle for said components, and a secondary mixing chamber comprising an elongate tube characterized by a non-wettable interior surface, said tube being disposed to receive partially intermixed components from the primary mixing chamber, the length and internal diameter of said tube having a predetermined relation to the pressure of the air vehicle and to the aggregate volumetric rate of flow of the components to the primary mixing chamber.

2. A mixing and discharging device comprising a primary mixing chamber, means for conducting a fluid vehicle in a plurality of streams into the mixing chamber, means for conducting to the mixing chamber a plurality of components to be mixed therein, means for directing the components into the mixing chamber to a point of interfluence of the components within the chamber, and means for directing the streams of the fluid vehicle into the chamber in paths directed toward the point of interfluence of the streams of components.

3. A mixing and discharging device comprising a primary mixing chamber, means for conducting a fluid vehicle in a plurality of streams into the mixing chamber, means for conducting to the mixing chamber a plurality of components to be mixed therein, means for directing the components into the mixing chamber to a point of interfluence of the components within the chamber, means for directing the streams of the fluid vehicle into the chamber in paths directed toward the point of interfluence of the streams of components, and a secondary mixing chamber communicating with the primary mixing chamber.

4. A mixing and discharging device comprising a barrel having incorporated therein a primary mixing chamber and having a plurality of ducts for conducting to the primary mixing chamber a plurality of components to be mixed therein and having also a plurality of ducts for conducting to the mixing chamber a plurality of streams of a fluid vehicle, said first-mentioned ducts and said last-mentioned ducts all being directed toward a common interfluence within the primary mixing chamber, and a tube providing a secondary mixing chamber communicating with the primary mixing chamber.

5. A mixing and discharging device comprising a barrel having incorporated therein a primary mixing chamber and having a plurality of ducts for conducting to the primary mixing chamber a plurality of components to be mixed therein and having also a plurality of ducts for conducting to the mixing chamber a plurality of streams of a fluid vehicle, said first-mentioned ducts and said last-mentioned ducts all being directed toward a point of common interfluence within the primary mixing chamber, and a tube providing a secondary mixing chamber communicating with the primary mixing chamber, said tube being characterized by a non-wettable inner surface formed therein.

6. That method of mixing and discharging liquid components which comprises separately conducting a plurality of liquid components to a primary mixing chamber, effecting interfluence of streams of the liquid components in the primary mixing chamber, subjecting the liquid components in the primary mixing chamber to the action of a plurality of air streams under pressure sufficient to effect partial intermixing of the components by turbulence but insufficient to atomize the components, and employing the air delivered to the primary mixing chamber as a vehicle to conduct the partially intermixed components through an elongate secondary mixing chamber and to effect the completion of the intermixing of the components within the secondary mixing chamber by their interflow along the inner surface of the chamber and by the disintegration of waves of liquid in the chamber by the force of the air stream.

7. That method of mixing and discharging liquid components which comprises separately conducting a plurality of liquid components to a primary mixing chamber, effecting interfluence of streams of the liquid components in the primary mixing chamber, subjecting the liquid components in the primary mixing chamber to the action of a plurality of air streams at a velocity sufficient to effect partial intermixing of the components by turbulence but insufficient to atomize the components, and employing the air delivered to the primary mixing chamber as a vehicle to conduct the partially intermixed components through an elongate secondary mixing chamber of which the walls are non-wettable by said components, and to effect the completion of the intermixing of the components within the secondary mixing chamber by their interflow along the inner surface of the chamber and by the folding over of waves of liquid in the chamber by the force of the air stream.

8. That method of mixing, reacting and discharging liquid components which comprises separately conducting to a primary mixing chamber a plurality of liquid components which will react when mixed with evolution of heat and with increase in viscosity, effecting interfluence of streams of liquid components in the primary mixing chamber, subjecting the liquid components in the primary mixing chamber to the action of a plurality of air streams at a velocity sufficient to effect partial intermixing of the components by turbulence but insufficient to atomize the components, and employing the air delivered to the primary mixing chamber as a vehicle to conduct the partially intermixed components through an elongate secondary mixing chamber of which the walls are non-metallic and non-wettable by said components and to effect the completion of the intermixing of the components within the secondary mixing chamber by their interflow along the inner surface of the chamber and by the folding over of waves of liquid in the chamber by the force of the air stream.

9. That method of mixing, reacting and discharging liquid components comprising a prepolymer of a polyisocyanate and a material having two or more active hydrogen atoms in the ratio of from 2:1 to 10:1, with water and a catalyst capable of interacting with said prepolymer to form a polyurethane resin foam, which comprises separately conducting these liquid components to a primary mixing chamber, effecting interfluence of streams of the liquid components in the primary mixing chamber, subjecting the liquid components in the primary mixing chamber to the action of a plurality of air streams at a velocity sufficient to effect partial intermixing of the components by turbulence but insufficient to atomize the components, and employing the air delivered to the primary mixing chamber as a vehicle to conduct the partially intermixed components through an elongate secondary mixing chamber having a nonmetallic inner surface, intermixing of the components within the secondary mixing chamber being effected by their interflow along the inner surface of the chamber and by folding over of waves of liquid in the chamber by the force of the air stream.

References Cited in the file of this patent

UNITED STATES PATENTS

| | | |
|---|---|---|
| 2,532,187 | Paasche | Nov. 28, 1950 |
| 2,705,132 | Neville | Mar. 29, 1955 |
| 2,764,455 | Seibel | Sept. 25, 1956 |